US006831603B2

(12) United States Patent
Menache

(10) Patent No.: US 6,831,603 B2
(45) Date of Patent: Dec. 14, 2004

(54) MOTION TRACKING SYSTEM AND METHOD

(75) Inventor: Alberto Menache, Los Angeles, CA (US)

(73) Assignee: Menache, LLC, Los Angeles, CA (US)

( * ) Notice: Subject to any disclaimer, the term of this patent is extended or adjusted under 35 U.S.C. 154(b) by 0 days.

(21) Appl. No.: 10/386,586

(22) Filed: Mar. 11, 2003

(65) Prior Publication Data

US 2004/0017313 A1 Jan. 29, 2004

Related U.S. Application Data

(60) Provisional application No. 60/363,915, filed on Mar. 12, 2002.

(51) Int. Cl.$^7$ ................................................ G01S 3/02
(52) U.S. Cl. ..................................................... 342/463
(58) Field of Search ................................. 342/463, 465

(56) References Cited

U.S. PATENT DOCUMENTS

| | | | |
|---|---|---|---|
| 4,660,039 A | 4/1987 | Barricks et al. | |
| 4,945,305 A | 7/1990 | Blood | |
| 5,056,106 A | 10/1991 | Wang et al. | |

(List continued on next page.)

FOREIGN PATENT DOCUMENTS

| | | |
|---|---|---|
| CA | 2405048 | 11/2001 |
| JP | 10-7429 | 3/1998 |
| JP | 10-222668 | 8/1998 |
| JP | 10-261090 | 9/1998 |
| JP | 2000-146509 | 5/2000 |
| JP | 2000-231638 | 8/2000 |
| JP | 2001-215458 | 8/2001 |
| JP | 2001-26551 | 9/2001 |
| WO | WO 98/41815 | 9/1998 |
| WO | WO 98/46029 | 10/1998 |
| WO | WO 98/47426 | 10/1998 |
| WO | WO 99/53339 | 10/1999 |
| WO | WO 99/53443 | 10/1999 |
| WO | WO 01/09861 | 2/2001 |
| WO | WO 01/35208 | 5/2001 |

OTHER PUBLICATIONS

Reynolds Matthew; "A Phase Measurement Radio Positioning System for Indoor Use"; MIT; Feb. 3, 1999.

Lancaster, Don; "Tech Mustings"; No. 135; Apr. 1999.

Hightower, Jeffrey, et al; "SpotON" An Indoor 3D Location Sensing Technology Based on RF Signal Strength; UW CSE Technical Report #2000–02–02; Feb. 18, 2000.

Hightower, Jeffrey and Gaetano Borriello; "Location Systems for Ubiquitous Computing"; IEEE computer Magazine; Aug. 2001.

Foxlin, Eric; "Motion Tracking Requirements and Technologies"; Extended draft versino of Chapter 8 in Handbood of Virtual Environment Technology; Kay Stanney, Ed.; Lawrence Erlbaum Associates; 2002.

Kitasuka, Terukai, et al.; "Location Estimation System Using Wireless Ad–Hoc Network"; 2002.

(List continued on next page.)

*Primary Examiner*—Bernarr E. Gregory
*Assistant Examiner*—Fred H. Mull
(74) *Attorney, Agent, or Firm*—Fulwider, Patton, Lee & Utecht, LLP

(57) ABSTRACT

A method for tracking objects within a three-dimensional capture zone includes placing at least four sensors around the capture zone. A stationery reference tag is placed within the capture zone. Tags are coupled to objects to be tracked in the capture zone. Signals are periodically transmitted from the reference and object tags. These signals are received and the identification code, and code phase and carrier phase measurements are extracted. The code phrase and carrier phase measurements are processed to determine the position of each object tag with respect to the reference tag at each sampling instant.

29 Claims, 6 Drawing Sheets

U.S. PATENT DOCUMENTS

| | | | |
|---|---|---|---|
| 5,138,322 A | 8/1992 | Nuttall | |
| 5,216,429 A | 6/1993 | Nakagawa et al. | |
| 5,317,394 A | 5/1994 | Hale et al. | |
| 5,363,297 A | 11/1994 | Larson et al. | |
| 5,438,321 A | 8/1995 | Bernard et al. | |
| 5,450,070 A | 9/1995 | Massar et al. | |
| 5,458,123 A | 10/1995 | Unger | |
| 5,513,854 A | 5/1996 | Daver | |
| 5,581,257 A | 12/1996 | Greene et al. | |
| 5,583,517 A | 12/1996 | Yokev et al. | |
| 5,589,838 A | 12/1996 | McEwan | |
| 5,600,330 A | 2/1997 | Blood | |
| 5,729,475 A | 3/1998 | Romanik, Jr. | |
| 5,744,953 A | 4/1998 | Hansen | |
| 5,767,669 A | 6/1998 | Hansen et al. | |
| 5,802,220 A | 9/1998 | Black et al. | |
| 5,831,260 A | 11/1998 | Hansen | |
| 5,884,239 A | 3/1999 | Romanik, Jr. | |
| 6,005,548 A | 12/1999 | Latypov et al. | |
| 6,050,962 A | 4/2000 | Kramer et al. | |
| 6,070,269 A | 6/2000 | Tardif et al. | |
| 6,095,928 A | 8/2000 | Goszyk | |
| 6,104,379 A | 8/2000 | Petrich et al. | |
| 6,115,052 A | 9/2000 | Freeman et al. | |
| 6,127,672 A | 10/2000 | Danisch | |
| 6,148,280 A | 11/2000 | Kramer | |
| 6,157,592 A | 12/2000 | Kriz et al. | |
| 6,172,499 B1 | 1/2001 | Ashe | |
| 6,176,837 B1 | 1/2001 | Foxlin | |
| 6,181,371 B1 | 1/2001 | Maguire, Jr. | |
| 6,204,813 B1 | 3/2001 | Wadell et al. | |
| 6,269,172 B1 | 7/2001 | Rehg et al. | |
| 6,272,231 B1 | 8/2001 | Maurer et al. | |
| 6,288,785 B1 | 9/2001 | Frantz et al. | |
| 6,316,934 B1 | 11/2001 | Amorai-Moriya et al. | |
| 6,324,296 B1 | 11/2001 | McSheery et al. | |
| 6,369,564 B1 | 4/2002 | Khalfin | |
| 6,380,894 B1 | 4/2002 | Boyd et al. | |
| 6,380,933 B1 | 4/2002 | Sharir et al. | |
| 6,400,139 B1 | 6/2002 | Khalfin et al. | |
| 6,409,687 B1 | 6/2002 | Foxlin | |
| 6,428,490 B1 | 8/2002 | Kramer et al. | |
| 6,549,004 B1 * | 4/2003 | Prigge | 324/207.17 |
| 6,563,107 B2 | 5/2003 | Danisch et al. | |
| 6,567,116 B1 | 5/2003 | Aman et al. | |
| 6,580,811 B2 | 6/2003 | Maurer et al. | |
| 2001/0033675 A1 | 10/2001 | Maurer et al. | |
| 2002/0097245 A1 | 7/2002 | Jeong et al. | |
| 2002/0145563 A1 | 10/2002 | Kane et al. | |
| 2003/0002033 A1 | 1/2003 | Boman | |
| 2003/0045816 A1 | 3/2003 | Foxlin | |
| 2003/0079218 A1 | 4/2003 | Goldberg | |
| 2003/0083596 A1 | 5/2003 | Kramer et al. | |
| 2003/0095708 A1 | 5/2003 | Pittel | |
| 2003/0120425 A1 | 6/2003 | Stanley et al. | |

OTHER PUBLICATIONS

Trakus, Inc.; Various pages from http://www.trakus.com; displaying "Copyright 2002" and printed on Dec. 16, 2003.

Menache, Alberto, "Understanding Motion Capture for Computer Animation and Video Games" Academic Press 2000 (pp. vii–ix, xiii–xiv, 1–2, 14–37, 205–206).

J. Hightower et al., Design and Calibretion of the SpotON Ad–Hoc Location Sensing System, Aug. 2001.

* cited by examiner

MOTION TRACKING SYSTEM AND METHOD

RELATED APPLICATION

This application claims priority from U.S. Provisional application Ser. No. 60/363,915, filed Mar. 12, 2002.

BACKGROUND OF THE INVENTION

Motion tracking, also known as Motion capture is the process of recording a live motion event and translating it into usable mathematical terms by tracking a number of key points in space over time and combining them to obtain a single three-dimensional representation of the performance. In brief, it is the technology that enables the process of translating a live performance into a digital performance. The captured subject could be anything that exists in the real world and has motion; the key points are the areas that best represent the motion of the subject's different moving parts. These points should help resolve pivot points or connections between rigid parts of the subject. For a human, for example, some of the key points are the joints that act as pivot points and connections for the bones. The location of each of these points is identified by one or more sensors, markers, or potentiometers that are placed on the subject and that serve, in one way or another, as conduits of information to the main collection device.

There are a number of existing systems that can track the motion of human, animal or inanimate subjects. Existing motion capture systems are classified as outside-in, inside-out, and inside-in systems. These names are indicative of where the capture sources and sensors are placed.

An outside-in system uses external sensors to collect data from sources placed on the body. Examples of such systems are camera-based tracking devices, in which the cameras are the sensors and the reflective markers are the sources.

Inside-out systems have sensors placed on the body that collect external sources. Electromagnetic systems, whose sensors move in an externally generated electromagnetic field, are examples of inside-out systems. Inside-in systems have their sources and sensors placed on the body. Examples of these devices are electromechanical suits, in which the sensors are potentiometers or powered goniometers and the sources are the actual joints inside the body.

The principal technologies used today that represent these categories are optical, electromagnetic, and electromechanical human tracking systems.

Optical Motion Capture Systems

Optical motion capture is a very accurate method of capturing certain motions when using a state-of-the-art system. It is a real-time process with certain limitations, such as marker count and number of performers and cameras.

A typical optical motion capture system is based on a single computer that controls the input of several digital CCD (charge-coupled device) cameras. CCDs are light-sensitive devices that use an array of photoelectric cells (also called pixels) to capture light, and then measure the intensity of the light for each of the cells, creating a digital representation of the image. A CCD camera contains an array of pixels that can vary in resolution from as low as 128×128 to as high as 4096×4096 or even greater.

Obviously, the higher the resolution, the better, but there are other trade-offs. The samples-per-second rate, or frame rate, has to be fast enough for capturing the nuances of very fast motions. By today's standards, a CCD camera with a resolution of 4096×4096 would be able to produce less than one frame per second. Another important feature is shutter synchronization, by which the camera's shutter speed can be synchronized with external sources, such as the light-emitting diodes (LEDs) with which optical motion capture cameras are usually outfitted.

The number of cameras employed is usually no less than 4 and no more than 32, and they capture the position of reflective markers at speeds anywhere between 30 and 1000 samples per second. The cameras are normally fitted with their own light sources that create a directional reflection from the markers, which are generally spheres covered with a material such as Scotch-Brite tape. Infrared light sources are preferred because they create less visual distortion for the user. The marker spheres can vary from a few millimeters in diameter, for small-area captures, to a couple of inches.

The optical system must be calibrated by having all the cameras track an object with known dimensions that the software can recognize, such as a cube or a wand with reflective markers. By combining the views from all cameras with the known dimensions of the object, the exact position of each camera in space can be calculated. If a camera is bumped even slightly, a new calibration must be performed. It is a good idea to recalibrate the system after every few minutes of capture, since any kind of motion or vibration can shift the position of a camera, especially if the studio is located on unstable ground.

At least two views are needed to track a single point's three-dimensional position, and extra cameras are necessary to maintain a direct line of sight from at least two cameras to every marker. That doesn't mean that more cameras are better, because each additional camera increases post-processing time.

Once the camera views are digitized into the computer, it is time for the post-processing to begin. The first step is for the software to try to produce a clean playback of only the markers. Different image processing methods are used to minimize the noise and isolate the markers, separating them from the rest of the environment. The most basic approach is to separate all the groups of pixels that exceed a predetermined luminosity threshold. If the software is intelligent enough, it will use adjacent frames to help solve any particular frame. The system operator has control over many variables that will help in this process, such as specifying the minimum and maximum lines expected per marker so the software can ignore anything smaller or bigger than these values.

The second step is to determine the two-dimensional coordinates of each marker for each camera view. This data will later be used in combination with the camera coordinates and the rest of the camera views to obtain the three-dimensional coordinates of each marker.

The third step is to actually identify each marker throughout a sequence. This stage requires the most operator assistance, since the initial assignment of each marker has to be recorded manually. After this assignment, the software tries to resolve the rest of the sequence until it loses track of a marker due to occlusion or crossover, at which point the operator must reassign the markers in question and continue the computation. This process continues until the whole sequence is resolved and a file containing positional data for all markers is saved.

The file produced by this process contains a sequence of marker global positions over time, which means that only each marker's Cartesian (x, y, and z) coordinates are listed per frame and no hierarchy or limb rotations are included.

Electromagnetic Trackers

Electromagnetic motion capture systems are part of the six degrees of freedom electromagnetic measurement systems' family and consist of an array of receivers that measure their spatial relationship to a nearby transmitter. These receivers or sensors are placed on the body and are connected to an electronic control unit, in most cases by individual cables.

Also called magnetic trackers, these systems emerged from the technology used in military aircraft for helmet-mounted displays (HMDs). With HMDs, a pilot can acquire a target by locating it visually through a reticle located on the visor. A sensor on the helmet is used to track the pilot's head position and orientation.

A typical magnetic tracker consists of a transmitter, 11 to 18 sensors, an electronic control unit, and software. A state-of-the-art magnetic tracker can have up to 90 sensors and is capable of capturing up to 144 samples per second. The cost ranges from $5,000 to $150,000, considerably less than optical systems. To take advantage of the real-time capabilities of a magnetic tracker, it must be connected to a powerful computer system that is capable of rendering a great number of polygons in real time. Depending on the needs of a particular project, the cost of this computer system alone could exceed the cost of the magnetic tracker.

The transmitter generates a low-frequency electromagnetic field that is detected by the receivers and input into an electronic control unit, where it is filtered and amplified. Then it is sent to a central computer, where the software resolves each sensor's position in x, y, and z Cartesian coordinates and orientation (yaw, pitch, and roll). This data is piped into another algorithm that, in most cases, will convert each sensor's global orientation and position into one hierarchical chain with only one position and multiple rotations.

The whole process is not truly real-time, but it is close, depending on the amount of filtering, amplifying, and post-processing, and the speed of the connection between the control unit and the host computer. Slow and congested Ethernet connections can slow this process down considerably. Magnetic trackers have a specification called latency, which indicates the amount of time elapsed between the data collection and the display of the resulting performance. This specification can vary from a few milliseconds to a few seconds.

Magnetic trackers such as the Flock of Birds by Ascension Technology Corporation use direct current (DC) electromagnetic fields, whereas others, such as the Polhemus ULTRATRAK PRO, use alternating current (AC) fields. Both of these technologies have different problems associated with metallic conductivity. AC trackers are very sensitive to aluminum, copper, and carbon steel, but not as sensitive to stainless steel or iron, whereas DC trackers have problems with ferrous metals, such as iron and steel, but not with aluminum and copper.

Many of these conductivity problems are caused by the induction of a current in the metal that creates a new electromagnetic field that interferes with the original field emitted by the tracker. These new fields are called eddy currents. Some magnetic trackers use special algorithms to compensate for these distortions by mapping the capture area, but these calibrations only work with static, predefined problem areas such as metallic structures in buildings. In most cases, it is better to avoid any high-conductivity metals near the capture area. This limitation makes the magnetic tracker difficult to transport to different locations.

Electromechanical Suits

The electromechanical motion capture suit is a group of structures linked by potentiometers or similar angular measurement devices located at the major human joint locations; it is driven by a human body's actions.

Potentiometers are components that have been used for many years in the electronics industry, in applications such as volume controls on old radios. A slider moving along a resistor element in the potentiometer produces a variable voltage-potential reading, depending on what percentage of the total resistance is applied to the input voltage. The potentiometers used for motion capture suits and armatures are much more complex versions of the old radio volume knob; they are sometimes called analog or digital angular sensors.

One big drawback of electromechanical systems based on potentiometers is their inability to measure global translations. In most cases, an electromagnetic sensor is added to the configuration to solve this problem, but that subjects the setup to the same disadvantages as the electromagnetic systems, such as sensitivity to nearby metals. In addition, the design of most of these devices is based on the assumption that most human bones are connected by simple hinge joints, so they don't account for nonstandard rotations that are common to human joints, such as in the shoulder complex or the lower arm.

There exists motion tracking systems which are based, at least in part, on radio frequency (RF). These systems typically employ the use of tags which serve as both receivers and transmitters. Sensors are placed around a capture area and such sensor also transmit and receive signals. The sensors transmit to the tags on the objects instructing them to transmit a signal in order to track each tag. It will be appreciated by those skilled in the art that the complexity and cost of the system is increased when the tags and sensors are transceivers. Additionally, such systems in the past have required time synchronization between the tags and the sensors, or at least between the multiple sensors. This even further complicates the system. Moreover, such radio frequency systems only have an accuracy within a few inches.

Accordingly, there is a need for a motion capture system utilizing higher frequencies to record much more motion data than existing motion capture systems. Such a system should be capable of capturing not only linear motion, but also rotational motion. Such a motion capture system should yield a three-dimensional representation of the motion which can be examined from any possible angle. Such a system should also be capable of being used in a variety of settings. Such a system should further be able to track thousands of objects, or points, to a very high degree of accuracy. The present invention fulfills these needs and provides other related advantages.

SUMMARY OF THE INVENTION

The motion tracking system of the present invention tracks the motion of human, animal or inanimate subjects using radio frequency technology. The present invention is an outside-in system. More specifically, the present invention employs multiple antennas and specialized software to locate transmitters placed on the objects. The global location of each transmitter is combined to create a digital representation of the tracked object. The data is also used to create movement-related databases, including, but not limited to, statistics on speed, velocity, and other types of motion analysis.

Applications of this invention include video games, television, cartoons, commercials, music videos, feature films, digital extras, digital stunts, and digital crowds. This invention provides the advantages of optical systems (extremely accurate, large number of markers, easy to change marker configuration, performers not constrained by cables, and large performance areas) without the disadvantages (extensive post-processing, expensive hardware, inability to capture occluded markers, and the need for a controlled environment).

The method for tracking object movement in a capture zone in accordance with the present invention generally comprises the steps of placing a plurality of sensors around the capture zone. Typically, at least four sensors are required. A stationery reference tag is placed within the capture zone. At least one tag, and preferably a plurality of tags, are coupled to the objects to be tracked in the capture zone. Signals are periodically transmitted from the reference tag and the object tags. These signals are received at the sensors where the code phase and carrier phase measurement for each signal received is extracted. The code phase and carrier phase measurements are processed to determine the position of the tags with respect to the reference tag.

The reference tag and each object tag transmits signal burst modulated with a digital data pattern having a portion common to all tags, and a portion unique to each tag. The common portion comprises a Neuman-Hofman synchronization code. The unique portion, comprising the identification code of the tag, comprises code words of a binary extended quadratic residue code. The multiple object tags are divided into segments of a transmission frequency and range. Preferably, the band range is at the 5.8 GHz band range, although other band ranges can be used, such as 60 GHz or 2.4 GHz.

The tag signals are circularly polarized. The processing of the code phase and carrier phase measurements of each tag includes the step of forming single difference measurements for each object tag measurement and reference tag measurement. Double difference measurements are then formed by pair wise differencing the single difference measurements from different sensors relating to the same object tag to determine the position of that tag. The double difference measurements are then combed.

The carrier phase measurements are corrected for sensor antenna phase center variations as a function of signal arrival angle. Typically, the sensors are calibrated to reduce error. The carrier phase measurements are also corrected for variations in the radio refractive index.

The change of object tag position over time can be used to determine velocity, acceleration and jerk of each object tag in any given axis. Such can be used by a biomechanical solver, or other software, to determine object movement, create animation, etc.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
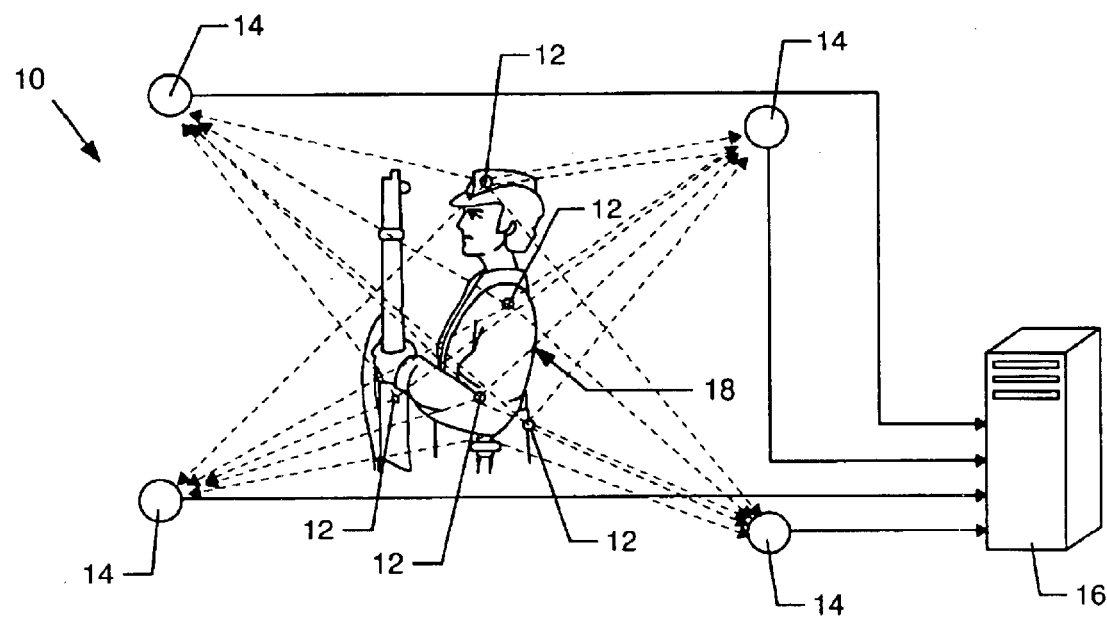
FIG. 1 is a schematic illustration of a RF motion tracking system embodying the present invention.

As shown in the drawings for purposes of illustration, the present invention resides in a motion tracking system 10. As is the case with other motion tracking systems, the radio frequency (RF) motion tracking system of the present invention is a combination of hardware and software components.

Figure 2:
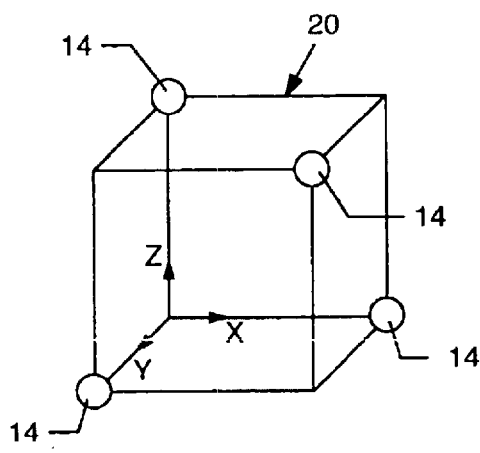
FIG. 2 is a schematic illustration of a capture zone defined by four sensors in accordance with the present invention.
Figure 3:
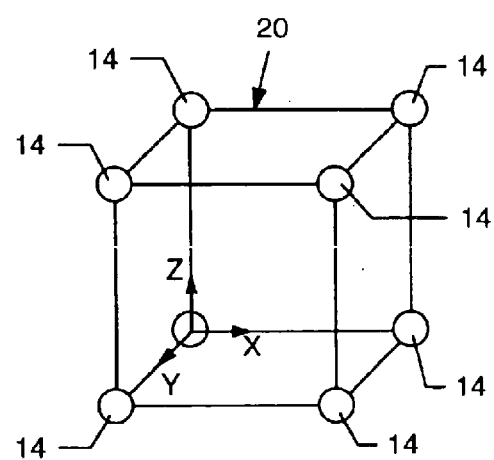
FIG. 3 is another illustration of a capture zone defined by eight sensors; one at each vertex of the capture zone.
Figure 4:
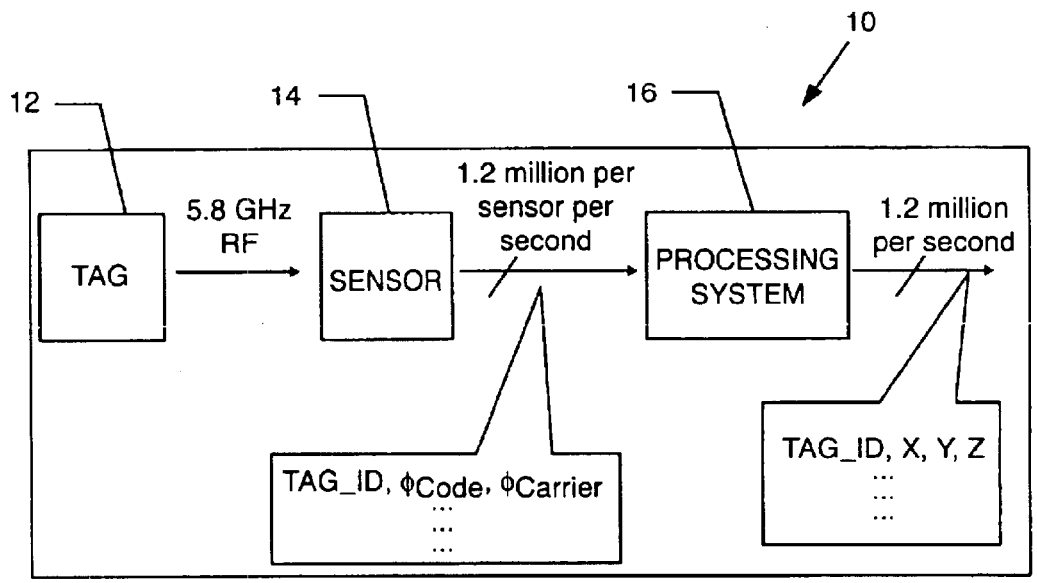
FIG. 4 is a functional block diagram of the interface of various components comprising the present invention.

The invention is composed of three subsystems: active RF tags 12 ("Tags"), passive sensors 14 ("Sensors"), and processing equipment 16 ("Processing Equipment") as shown in FIG. 1. Multiple tags 12 are attached to each object 18 to be captured. The tags transmit direct-sequence spread-spectrum microwave signal bursts. Unique ID codes are used to distinguish between the tags. A minimum of four sensors are placed around the periphery of the capture zone or area 20, as illustrated in FIG. 2, with a minimum of eight sensors being preferred as shown in FIG. 3. The sensors down-convert and A/D sample the received signal band. Digital samples from the sensors are processed to extract code phase and carrier phase for each tag, and these phase estimates are processed to determine the positions of all tags in the capture zone at each sampling instant. Raw position information is then output to the processor for subsequent processing, as illustrated in FIG. 4.

The illustrated and described system 10 is designed to operate with a capture zone 20 of up to 130 m×55 m×10 m in dimension and can capture the positions of tags 12 anywhere within the zone 20. The minimum preferred sensor 14 configuration is eight sensors, one each at each of the vertices of the capture zone 20. Up to an additional twenty-four sensors 14 placed around the periphery of the capture zone 20 provide enhanced performance. The sensors 14 are typically setback such that there is 5 to 15 meters between the front of a sensor 14 and the capture zone 20. Tags 12 are excluded from a volume defined by a plane tangent to the capture zone 20 at its closest point to a sensor 14 and a parallel plane twice the setback distance of sensor 14 away from the closes point of the capture zone 20.

The system 10 is designed to operate with up to 5,000 tags 12 in the capture zone 20, and to provide full accuracy for tag dynamics up to 4.5 m/s velocity per axis, 0.45 g acceleration per axis, and 0.45 g/s jerk per axis. Reduced accuracy is provided for dynamics up to 45 m/s velocity per axis, 4.5 g acceleration per axis, and 4.5 g/s jerk per axis. The system 20 provides a 90% probability of capturing each individual tag 12 within the capture zone 20 which has an unobstructed line-of-sight to minimum of four sensors 14.

The system 10 provides tag 12 position outputs in X, Y, Z local level coordinates relative to the location of fixed reference tag (not shown) placed within the capture zone 20. The position latency typically does not exceed 0.1-seconds. The position or transmission output rate for each tag 12 is selectable from 1, 2, 3, 4, 5, 6, 8, 10, 12, 15, 16, 20, 24, 30, 40, 48, 60, 80, 120, and 240 per second. Output accuracy is approximately 1-mm 1-sigma per axis during periods of limited dynamics, and 10-mm 1-sigma per axis during periods of high dynamics. The output precision is approximately 1-mm per axis.

The total output data rate of the system 10 with 5,000 tags 12 in the capture zone 20 is 9 MBytes/sec of unformatted data or 10.8 MBytes/sec with data formatted to byte boundaries. The position data for each tag 12 can be formatted as 17-bits of X-position, 16-bits of Y-position, 14-bits of Z-position, and 13-bits of tag ID. With byte boundary formatting the output position consists of 3-bytes of X-position, 2-bytes of Y-position, 2-bytes of Z-position, and 2-bytes of tag ID.

The sensors 14 generate digital samples with a timing accuracy of 67 microseconds. They have a minimum 29 dB RF input dynamic range, and their antennas provide a field of view covering the entire capture zone 20.

One embodiment of the invention will now be described. It operates in the 5.725–5.850 GHz band, a 125 MHz bandwidth, under Part 15, unlicensed equipment, authorization, specifically 47 CFR 15.249. To comply with this section, the average tag EIRP is limited to 0.75 mW, the peak harmonic emissions to 0.000075 mW EIRP, peak non-harmonic out-of-band emissions to less than −50 dBc, with a peak to average ratio not exceeding 20 dB. An alternative embodiment operates in compliance with 15.247 allowing operation at up to 1 W peak transmit power with 10 dB minimum spreading gain, but limiting peak transmit power to comply with the 25 mW European EIRP limit and 30 mW Mexican limit. Of course, the invention can operate in yet other bandwidth, typically between 2 GHz and 60 GHz.

Figure 5:
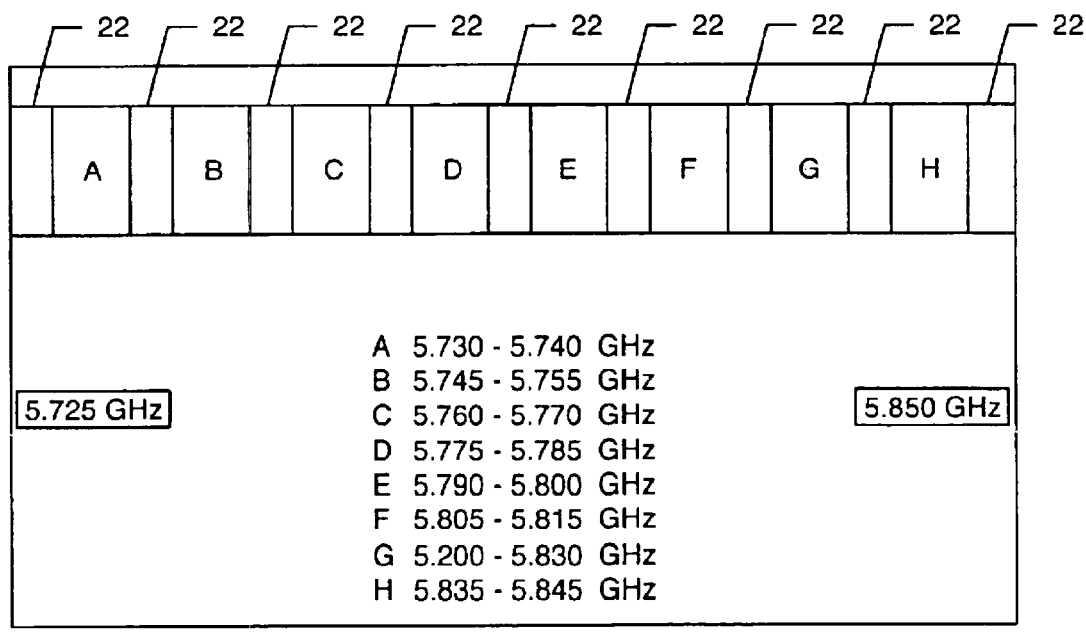
FIG. 5 is a schematic illustration of a portion of bandwidth used to send and receive signals in accordance with the present invention.

The frequency plan is shown in FIG. 5. The band has been divided into eight channels, A through H, each 10 MHz wide and separated by 5 MHz guard bands. The tags 12 on the one or more objects 18 within the capture zone 20 are divided into groups, each group being assigned a different segment of RF spectrum for the tag 12 transmissions.

Figure 6:
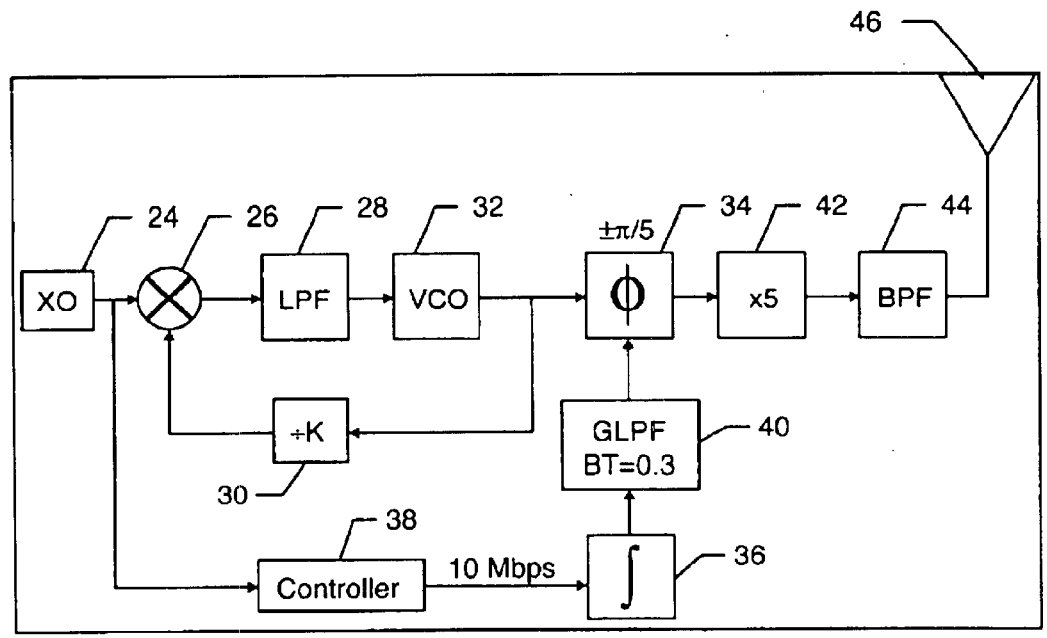
FIG. 6 is a functional block diagram of an object tag transmitter used in accordance with the present invention.

A functional block diagram of the tag 12 is shown in FIG. 6. The crystal oscillator 24 (XO) generates a reference carrier. A phase-lock-loop (PLL), consisting of a phase/frequency detector 26, low-pass filter (LPF) 28 and divider 30, is used to stabilize the output of a 1.16 GHz voltage controlled oscillator (VCO) 32 by locking it to the XO 24 reference carrier. The stabilized VCO output is phase modulated by a linear modulator 34 with range −π/5 to π/5. The modulating signal is generated by integrating 36 the controller 38 output waveform, and then Gaussian low-pass filtering it 40 with bandwidth-time product 0.3 42. The controller 38 periodically generates a data packet consisting of a synchronization header and a tag ID, both spread by a 10 Mbps pseudo-noise code. The signal is banned past filtered 44 and then transmitted 46.

Figure 7:
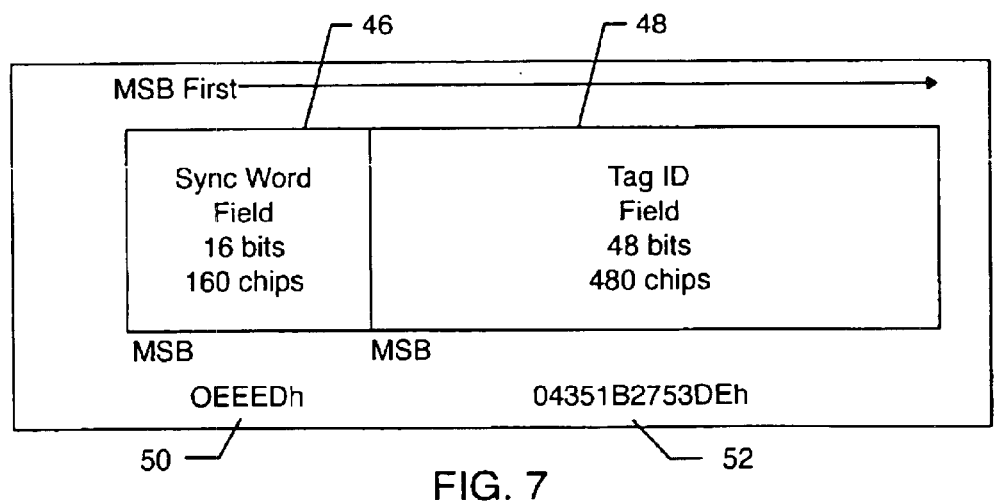
FIG. 7 illustrates a packet structure of data produced by each tag and transmitted to sensors in accordance with the present invention.

The tags 12 transmit a 64-bit burst at a 1 Mbps information rate. The packet structure of the signal burst is shown in FIG. 7. The 64 bits are partitioned into a 16-bit sync 46 and a 48-bit tag ID 48, beginning with the most significant bit (MSB). The burst duration is 64 microseconds. Each bit is divided into 10 chips from a 640-chip (pseudo noise) PN-code. Thus the code rate is 10 Mcps.

The 16-bit Neuman-Hofman sync word 50, 0EEDh (0000111011101101), is used for all packets. This sync pattern has excellent autocorrelation properties.

Tag ID is selected as a EQR-code vector 52 in the [48, 24, 12] binary extended quadratic residue code space. This ensures that all code vectors differ in a minimum of 12 bit positions. The tags 12 do not require an encoder as the tag ID is precomputed and stored in the tag 12.

Also, the sensors 14 do not require decoders since the tags 12 are identified by cross-correlation. The code generator polynomial is:

$$\prod_{n \in Q} (x - a^n)$$

where Q={1,2,3,4,6,7,8,9,12,14,16,17,18,21,24,25,27,28, 32,34,36,37,42}

The least significant bit (LSB) of the tag ID is computed such that the modulo-2 sum of the 47 bits plus the LSB is 0.

The multiple access architecture is a combination of frequency dimension multiple access (FDMA) and spread spectrum multiple access (SSMA). The tags 12 are evenly divided among the eight different frequency channels. All bursts in each channel are spread using the same 640-chip segment of a long PN-code which has good autocorrelation properties. Collisions between packets only occur if the first chip of one burst in a channel overlaps the first chip of any other burst in that channel at the sensor. The probability of a collision occurring is $P_c = 1 - e^{-2\tau\lambda}$ where $\tau$ is the chip duration (100 nsec) and $\lambda$ is channel rate (bursts/sec). For example, with 1 channel and $\lambda$=1.2 million bursts/sec the collision probability is $P_c$=21%. With two channels the bursts/sec per channel are reduced to $\lambda$=0.6 million, and $P_c$=11%. With four channels, $\lambda$=0.3 million bursts/sec/channel and $P_c$=5.8%. With eight channels, $\lambda$=0.15 million bursts/sec/channel and $P_c$=3.1%. Hence, with 8 channels and 240 measurements per second per tag, an average of 7.4 measurements per second per tag is lost due to collision.

Figure 8:
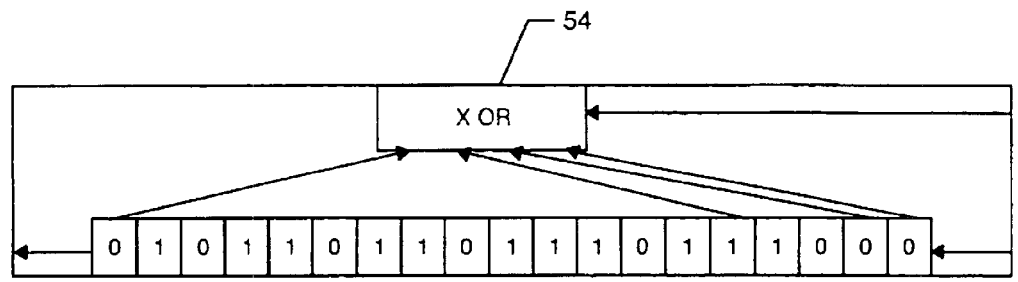
FIG. 8 is a schematic illustration of a spreading sequence generator used in accordance with the present invention.

The 640-chip pseudo-noise (PN) segment is generated from a 19-stage simple shift register generator (SSRG) 54, illustrated in FIG. 8, with maximal length feedback polynomial $x^{19}+x^5+x^2+x$ and initial condition 0EEDAh (0001110111011010). The SSRG exclusive OR's the bits in $19^{th}$, $5^{th}$, $2^{nd}$, and $1^{st}$ stages to generate an input to the $1^{st}$ stage. The bits are then shifted one stage to the left. The bit in the leftmost stage, the $19^{th}$, is output, as illustrated in FIG. 8. The chips are Gaussian minimum shift keying (GMSK) modulated with bandwidth-time product (BT)=0.3 at 10 Mcps.

Figure 9:
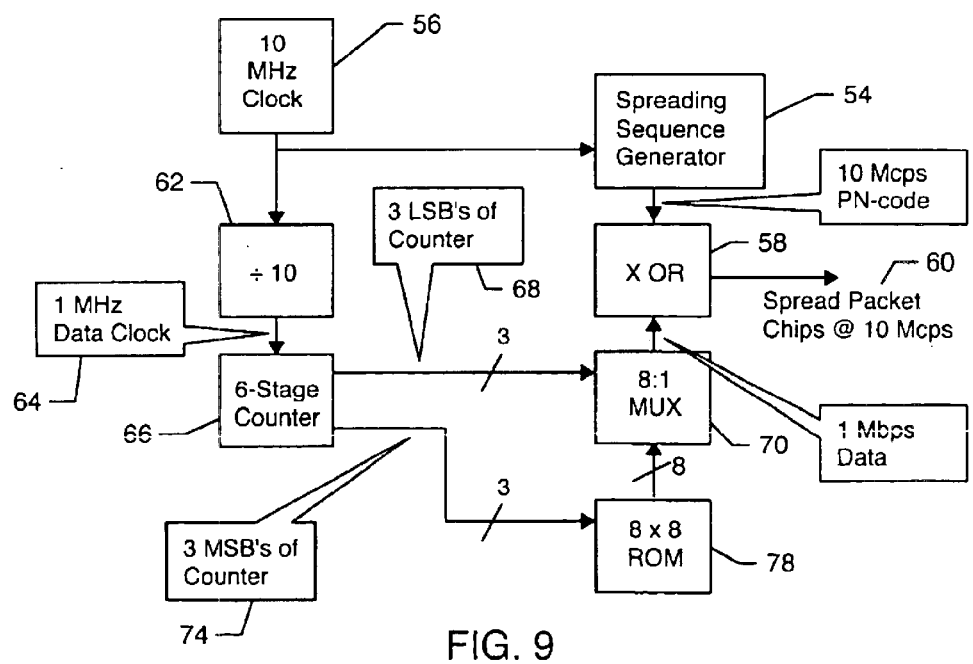
FIG. 9 is a functional block diagram of a spread packet generator used in accordance with the present invention.

FIG. 9 illustrates the functional block diagram of a spread packet generator used by the tag 12 to create the signal burst.

A 10 MHz clock 56 is applied to the spreading sequence generator 54. The 10 Mcps spreading sequence generator output is exclusive-or' ed 58 with the 1 Mbps data output from the ROM to form the 10 MCps spread packet chips output 60. Thus each data bit, is spread by 10 spreading sequence chips.

The 10 MHz clock 56 is also divided 62 by a factor of ten to form the 1 MHz data clock 64. The data clock is applied to a 6-stage binary counter 66 (divide by 64) The three LSB's of the counter 68 are applied to an 8-to-1 multiplexer 70 to select one of the eight data lines from the ROM 72. The three MSB's from the counter 74 are applied to the ROM address lines to select one of the eight words stored in the ROM 72.

Each tag 12 periodically emits a data packet modulated on a RF carrier, such as the exemplary 5.8 GHz band. The sensor 14 receives and demodulates the packets from the tags 12, and processes them to extract the tag ID, code phase, and carrier phase. This data is provided to the processing system 16 at a rate of 1.2 million measurements per second per sensor as illustrated in FIG. 2. The processing system 16 processes the measurements to determine X, Y, and Z position coordinates for each tag 12, a total of 1.2 million positions per second, as illustrated in FIG. 2.

Figure 10:
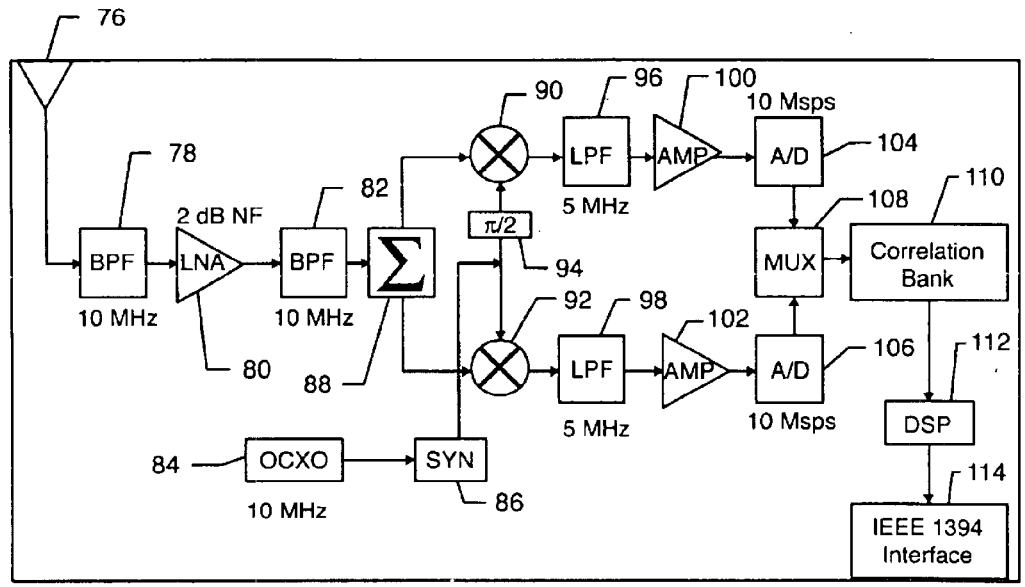
FIG. 10 is a functional block diagram of the operation of sensors used in accordance with the present invention.

FIG. 10 shows a function block diagram of the sensor 14. Each sensor 14 receives 76 the 5.8-GHz signals from the tags 12, bandpass filters 78 them to remove interference, and low noise amplifies them 80 to set the receiver noise floor. The low noise amplified signals are then bandpass filtered again to limit the noise power, and converted into in-phase and quadrature-phase baseband signals 84–94. The baseband signals are low pass filtered 96 and 98 amplified 100 and 102, and A-to-D converted 104 and 106 (sampled and quantized). The digital in-phase and quadrature-phase samples are multiplexed into a single data stream which is applied to a bank of correlators 110. The correlators determine parameters that are converted into the most likely tag ID, code phase, and carrier phase by the digital signal processor (DSP) 112. The estimates are then transferred to the processing system 16 via an interface, such as an IEEE-1394 interface 114.

Figure 11:
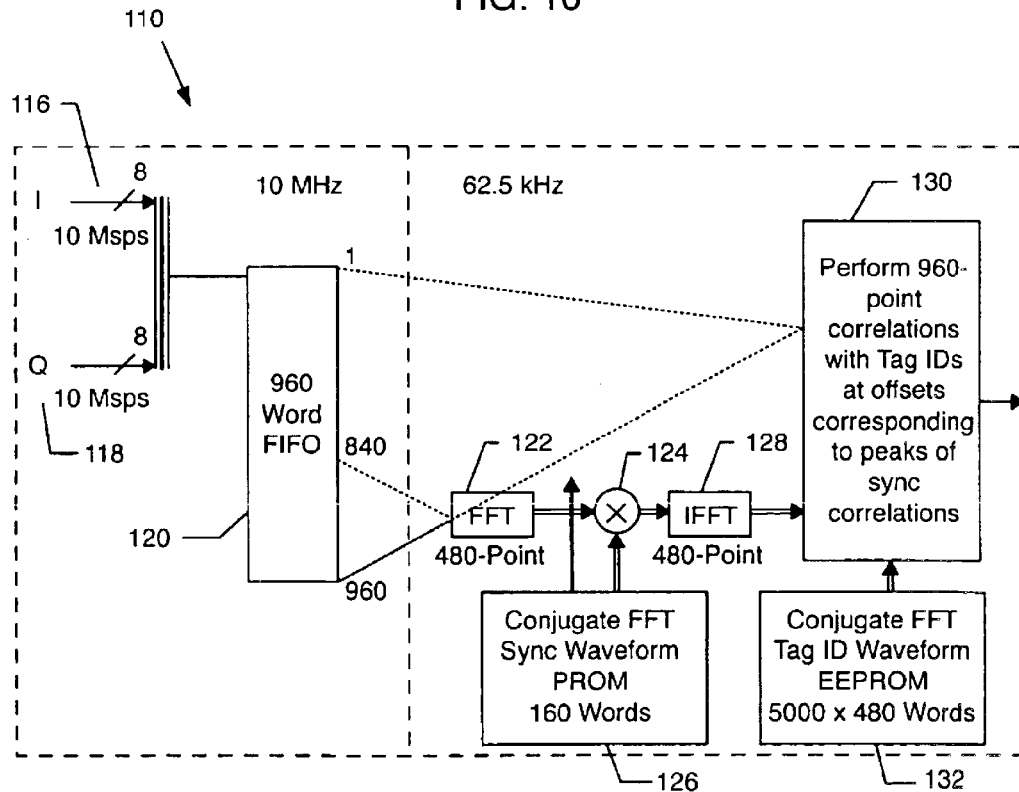
FIG. 11 is a functional block diagram of a correlation bank of the sensors.

With reference now to FIG. 11, correlation matched filters 110 are used to obtain time, frequency, and phase measurements. The correlation processing is performed at two levels. First, correlation with the sync field 46 of the tag 12 waveform is used for time and frequency synchronization. This correlation must be performed at frequencies that cover the range of possible Doppler shifts are oscillator offsets. The frequency range is divided into frequency bins, and correlation is performed at the center frequency of each bin. Since all of the tags 12 have the same sync field, the sync correlation detects all of the tags 12 seen by each sensor 14.

After a tag 12 has been detected and its received frequency bin identified, correlation with the ID field 48 is used to obtain code phase measurements and carrier phase measurements. The code phase measurements are generated by interpolating between the 100 nsec correlation samples to find the peak correlation value. The carrier phase measurements are generated by computing the argument of the interpolated peak correlation value. Each pair of 10 million sample per second (MSPS) 8-bit in-phase (I) and 8-bit quadrature-phase (Q) samples 116 and 118 are input to a FIFO (first in, first out) register 120. The sample pair 116 and 118 is stored as a 16-bit word. The FIFO is 960 words long. At a rate of 62.5-kHz, corresponding to 160 new words being input to the FIFO, FIFO contents are copied to a 960 word buffer. The 320 words corresponding to the oldest 320 words in the FIFO are copied from the buffer. This copy block is expanded from 320 words to 480 words by padding with 160 words consisting of all zeros. The zero padding is appended to the block next to the newest of the 320 words from the FIFO. The padded block is input to a 480-point complex FFT (fast Fourier transform) 122. The 8-bit I sample 116 is treated as the real part and the 8-bit Q sample 118 as the imaginary part. The FFT 122 is a fast implementation of the discrete Fourier transform (DFT), which is the discrete version of the continuous time Fourier transform.

The FFT output is multiplied 124 by a reference sync sequence 126. The 480 word reference sync sequence is precomputed and stored in a memory chip. The same reference sync sequence is used by all sensors 14. The reference sync sequence is generated by computing the complex FFT of a padded sequence and taking its complex conjugate (i.e. changing the algebraic sign of the Q part). The first 160 words of the padded sequence consist of the 160 words obtained by complex sampling the ideal sync waveform at 10 MSPS. The remaining 320 words consist of zero padding, i.e. words that are all zero.

Complex multiplication is used as follows:

$$IM = IF \times IF - QF \times QF$$

$$QM = IF \times QF + IF \times QF$$

where
IM and QM are the multiplier outputs
IF and QF are the FFT output
IF and QF are the output from the precomputed reference memory chip.

The multiplication is performed element by element, i.e. the first word of the FFT output block is multiplied by the first word of the precomputed reference, the second word by the second word, etc.

The result of the multiplication is a 480 word vector of complex numbers. This vector is input to a 480-point IFFT (inverse FFT) 128. The output of the IFFT is another 480 word vector of complex numbers. The magnitude of each of these numbers is computed by taking the square root of the sum of the squares of the I and Q values. The resulting 480 magnitudes are examined for peaks. Each peak corresponds to a tag sync field contained in the 320 words from the buffer, and the location of the peak identifies the start of the tag packet.

Since the sync field is contained within the last 320 words of the buffer, the tag ID field must be totally contained within the buffer. For each correlation peak identified by the sync correlation, the 480 words in the buffer corresponding to the associated ID field are copied. This copy block is expanded from 480 words to 960 words by padding with 480 words consisting of all zeros. The zero padding is appended to the block next to the newest of the 480 words from the FIFO. The padded block is input to a 960-point complex FFT (fast Fourier transform) 130. The 8-bit I sample 116 is treated as the real part and the 8-bit Q sample 118 as the imaginary part.

The FFT output is multiplied (using element by element complex multiplication) by each of the possible reference tag ID sequences. The 960 word reference ID sequences are precomputed and stored in a memory chip. The same set of reference ID sequences is used by all sensors 14. The reference ID sequences are generated by computing the complex FFT of a padded sequence and taking its complex conjugate 132. The first 480 words of a padded sequence consist of the 480 words obtained by complex sampling an ideal ID waveform at 10 MSPS. The remaining 480 words consist of zero padding.

The result of the multiplication is a 960 word vector of complex numbers. This vector is input to a 960-point IFFT (inverse FFT). The output of the IFFT is another 960 word vector of complex numbers. The magnitude and phase represented by each of these numbers is computed by taking the square root of the sum of the squares of the I and Q values, and by taking the arctangent of the Q value divided by the I value, ATAN(Q/I), respectively. Interpolation of the magnitude values is used to estimate the correlation peak; this value is the code phase measurement. Once the correlation peak has been identified, the phase values are interpolated to the same instant in time, the resulting value is the carrier phase measurement.

A mathematical description of the correlation processing follows. The received waveform samples are denoted by $s_w(n)$, where n=0 to P−1, and the reference waveform samples are denoted by $r_w(n)$, where n=0 to Q−1. Padded sample sequences, s and r, are generated as follows:

$s(k)=0$ for $k=0$ to $N-P$ and $s(k)=s_w(k-N+P)$ for $k=N-P+1$ to $N-1$ $r(k)=r_w(k)$ for $k=0$ to $Q-1$ and $r(k)=0$ for $k=Q$ to $N-1$ where N=P+Q.
Then the processing proceeds as follows:

S is computed as the fast Fourier Transform (FFT) of s

R is computed as the FFT of r

R* is computed as the conjugate of R

The correlation vector, C, is computed as the inverse FFT of S·R*.

Figure 12:
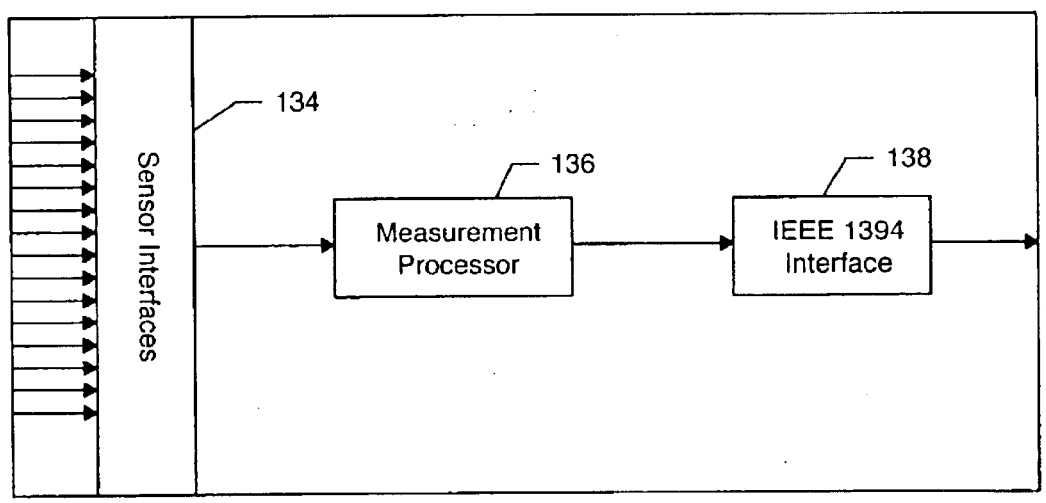
FIG. 12 is a functional block diagram of a processing system used to process signals received by the sensors in accordance with the present invention.

A functional block diagram of the processing subsystem 16 is shown in FIG. 12. The data on the IEEE-1394 interfaces from the various sensors 14 is input to the measurement processor 136, which converts the code and carrier phases into position estimates. The estimates are output via another IEEE-1394 interface 138. The processing system 16 uses the code phase and carrier phase measurements from the sensors 14 to determine the tag 12 positions at the sampling instants. Raw position information is then output to the software utilizing the tracking data. All positions are relative to a stationary reference tag. The code phase measurements are processed to provide a rough position estimate. This rough estimate is used to bound the ambiguity search, and carrier phase measurements are processed to obtain the final position estimate.

Double difference code phase measurements are formed using measurements from a tag A, and a stationary reference tag R. At the time of tags A and R n-th burst, tag R is located at (0,0,0) with clock $T_R(n)$, and tag A is located at $(X_A(n), Y_A(n), Z_A(n))$ with clock $T_A(n)$. Multiple sensors 14 receive the bursts from the tags 12. Sensor i is located at known position $(X_i, Y_i, Z_i)$ and stationary with clock $T_i(n)$. Then the measurement equations for tags A and R code phases as received at sensor i are given by $$PR_i^A(n) = \sqrt{(X^A(n) - X_i)^2 + (Y^A(n) - Y_i)^2 + (Z^A(n) - Z_i)^2} - c(T^A(n) - T_i(n))$$

$$PR_i^R(n) = \sqrt{X_i^2 + Y_i^2 + Z_i^2} - c(T^R(n) - T_i(n))$$

Wherein, PR is the pseudo range, or rough estimate, of the position of tag A with respect to the referenced tag R; and c is the speed of light.

Single differences of these measurements eliminates the sensor clock term giving:

$$PR_i^A(n) - PR_i^R(n) = F(X^A(n) - X_i, Y^A(n) - Y_i, Z^A(n) - Z_i) - F(X_i, Y_i, Z_i) - c(T^A(n) - T^R(n))$$

$$F(X, Y, Z) = \sqrt{X^2 + Y^2 + Z^2}$$

Double differences between sensors i's and j's single differences eliminates the tag's clocks terms giving $$\delta PR_{ij}^{AR}(n) = PR_i^A(n) - PR_i^R(n) - PR_j^A(n) + PR_j^R(n)$$
$$= -F(X_i, Y_i, Z_i) + F(X_j, Y_j, Z_j) + F(X^A(n) - X_i, Y^A(n) - Y_i, Z^A(n) - Z_i) - F(X^A(n) - X_j, Y^A(n) - Y_j, Z^A(n) - Z_j)$$

This equation has 3 unknowns, $X^A(n)$, $Y^A(n)$, and $Z^A(n)$. Measurements from 4 sensors 14 are required to form the 3 double differences required to obtain 3 equations in the 3 unknowns. Linearization around an approximate solution $[X_0^A(n), Y_0^A(n), Z_0^A(n)]$ reduces the measurement model to z=Hx, where $$x = \begin{bmatrix} \Delta X^A(n) \\ \Delta Y^A(n) \\ \Delta Z^A(n) \end{bmatrix} \quad z = \begin{bmatrix} \Delta \delta PR_{ij}^{AR}(n) \\ \Delta \delta PR_{jk}^{AR}(n) \\ \Delta \delta PR_{kl}^{AR}(n) \end{bmatrix} \quad H = \begin{bmatrix} \alpha x_{ij}^A & \alpha y_{ij}^A & \alpha z_{ij}^A \\ \alpha x_{jk}^A & \alpha y_{jk}^A & \alpha z_{jk}^A \\ \alpha x_{kl}^A & \alpha y_{kl}^A & \alpha z_{kl}^A \end{bmatrix}$$

$$\alpha x_{ij}^A = \frac{X_0^A(n) - X_i}{F(X_0^A(n) - X_i, Y_0^A(n) - Y_i, Z_0^A(n) - Z_i)} - \frac{X_0^A(n) - X_j}{F(X_0^A(n) - X_j, Y_0^A(n) - Y_j, Z_0^A(n) - Z_j)}$$

$$\alpha y_{ij}^A = \frac{Y_0^A(n) - Y_i}{F(X_0^A(n) - X_i, Y_0^A(n) - Y_i, Z_0^A(n) - Z_i)} - \frac{Y_0^A(n) - Y_j}{F(X_0^A(n) - X_j, Y_0^A(n) - Y_j, Z_0^A(n) - Z_j)}$$

$$\alpha z_{ij}^A = \frac{Z_0^A(n) - Z_i}{F(X_0^A(n) - X_i, Y_0^A(n) - Y_i, Z_0^A(n) - Z_i)} - \frac{Z_0^A(n) - Z_i}{F(X_0^A(n) - X_j, Y_0^A(n) - Y_j, Z_0^A(n) - Z_j)}$$

These equations are solved by computing the state estimate, x, as $$x = (H^T H)^{-1} H^T z.$$

The code phase estimate has an error of between 3 and 4 meters. Other error sources include sensor position error and multi-path error which can produce errors of 1 meter each. The remaining error sources are so small they can typically be ignored, including sensor antenna phase center variation and the atmospheric refraction.

The carrier phase measurement equation is $$\lambda[\varphi_i^A(n) + N_i^A] = \sqrt{(X^A(n) - X_i)^2 + (Y^A(n) - Y_i)^2 + (Z^A(n) - Z_i)^2} - c(T^A(n) - T_s(n))$$

where, $N_i^A$ is integer number of cycles between tag A and sensor i at reference time;

$\phi_i^A$ is fractional phase at reference time plus accumulated measured phase change since reference time (cycles); and λ is the wavelength of the signal.

Double differences can be formed similarly to code measurements as $$\delta \phi_{ij}^{AR}(n) = \phi_i^A(n) - \phi_i^R(n) - \varphi_j^A(n) + \phi_j^R(n)$$
$$= -\delta N_{ij}^A + N_i^R - N_j^R + \frac{1}{\lambda}[-F(X_i, Y_i, Z_i) + F(X_j, Y_j, Z_j) +$$
$$F(X^A(n) - X_i, Y^A(n) - Y_i, Z^A(n) - Z_i) -$$
$$F(X^A(n) - X_j, Y^A(n) - Y_j, Z^A(n) - Z_j)]$$

where $\delta N_{ij}^A = N_i^A - N_j^A$.

If the $\{\delta N_{ij}^A\}$ are known, then the linear measurement model is identical to the code phase model with the double difference code phase measurements replaced by the double difference carrier phase measurements. If the $\{\delta N_{ij}^A\}$ are unknown, then with $N_s$ sensors there are $N_s-1$ measurements (equations) and $3+N_s-1$ unknowns. For these equations to be solvable requires that $N_s-1 \geq 3+N_s-1$, hence there is no solution.

With $N_s$ sensors and $N_t$ epochs (or number of measurements at each sensor 14) there are $(N_s-1) \times N_t$ measurements (equations) and $3 \times N_t + N_s - 1$ unknowns. So, a solution requires that $(N_s-1) \times N_t \geq 3 \times N_t + N_s - 1$, which is true for 7 sensors with 2 epochs (12 equations with 12 unknowns) or 5 sensors with 4 epochs (16 equations with 16 unknowns). Regardless of the number of epochs, tag motion is required for a solvable system of equations.

The carrier phase measurement error is only 0.24 to 0.47 mm. Due to the small estimation error, other sources of error must be taken into account. For example, the carrier phase measurements must be corrected for the radio refractive index as the propagation timed by the speed of light varies according to atmospheric conditions. Algorithms for radio refractive index corrections are known in the art. Depending upon the temperature, pressure and humidity, such corrections can account for between 40 and 60 mm of correction alone. Overall error would be approximately 0.3 mm.

Carrier phase multipath error must also be taken into account. The carrier phase multipath error is given by:

$$\sigma_{MULTIPATH} = \frac{\lambda}{2\pi} \sqrt{\frac{1}{2\pi} \int_{-\pi}^{\pi} \tan^{-1}\left(\frac{\alpha \sin(\theta)}{1 + \alpha \cos(\theta)}\right) d\theta}$$

where $\lambda$ is carrier wavelength; and $\alpha$ is the product of the reflection coefficient and the code correlation (0 to 1).

A variety of techniques are available for multipath mitigation, including:

Circularly polarized signal

Good axial ratio sensor antennas

Choke ring sensor antennas

Digital processing at sensor

Multi-element sensor antennas

RF absorbent sensor ground plane

Higher carrier frequency.

Other error sources are the sensor antenna phase center variation and the sensor 14 position error. Phase center varies as a function of the signal arrival angle at the antenna. At 5.8 GHz variations of 2 to 5 mm are expected. These errors can be calibrated for each antenna and subtracted out of the measurements. A 10% modeling error leaves a 0.2 to 0.5 mm residual error.

The sensor 14 position can be measured to sub-millimeter accuracy as follows:

Install sensors with rigid supports

Switch all sensors to calibration mode

Tag signals are radiated from sensor antennas

Sensor receives are deactivated

Install reference tag with rigid supports and activate

Place calibration receiver at several known positions relative to reference tag

Collect data at each position

Process to determine sensor positions relative to reference tag

Taking into account all error sources, the position error per axis is only approximately 0.50–3.0 mm per object tag 12 in reference to the stationery reference tag. It will be appreciated by those skilled in the art that such a small position error given a large number of tags in a relatively large capture area has heretofore not been achieved.

Tracking software will receive the tag coordinates from the data processing equipment and will reduce data noise as necessary. The reduction will be carried out by different methods, such as averaging various adjacent samples, limiting the maximum variations on the coordinates or predicting positions based on history. Other noise reduction algorithms will be devised for this purpose. After the reduction, the tracking software will rebuild unavailable data. This reconstruction will be done by analyzing and completing existing trajectories.

A biomechanical solver program can take the tracking software output data and build the hierarchical structure to be used to recreate the subject's motion. This process involves combining up to three tags' 12 positions to recreate the rotations of a discrete part about its parent. The resulting hierarchical chain will consist of a single global translation and a series of rotations, such as, in the case of a human body, rotations for every limb about a local axis. All external applications will have as an input the data generated by the biomechanical solver program.

The main markets that currently benefit from motion capture are medicine, sports, entertainment, and law, but there are smaller markets that are also taking advantage of the technology. For example, motion capture equipment is used to help design ergonomic environments. In addition, it is used for automobile safety tests: The motion of crash test dummies is captured and analyzed.

Medicine

In clinical circles, motion capture is called three-dimensional biological measuring or three-dimensional analysis. It is used to generate biomechanical data to be used for gait analysis and several orthopedic applications, such as joint mechanics, analysis of the spine, prosthetic design, and sports medicine.

Gait analysis is useful in medicine because it accurately separates all the different mechanisms that are used during the multiple phases of a walk cycle in a way that makes it easy to detect certain abnormalities and changes. For example, gait analysis helps to measure any degree of change in conditions such as arthritis or strokes. It is also used along with other tests to determine treatment for certain pathological conditions that affect the way we walk, such as cerebral palsy. Rehabilitation by gait training is used for patients with pelvis, knee, or ankle problems.

The present invention can improve these existing applications due to its higher frequency. Newer applications include:

1) Real-time biomechanical analysis of patients in their own environment

The existing medical applications can be performed at the patient's home due to unobtrusive markers and the systems 10 low cost.

2) Patient monitoring

Patients with critical conditions can be monitored by the system 10 at home or at the hospital.

3) Remote medical procedures

Doctors can perform procedures remotely by transmitting their movements into telemetric instruments.

Sports

Sports analysis is a major application of motion capture. Three-dimensional data is being used extensively to improve the performance of athletes in sports such as golf, tennis, gymnastics, and even swimming by studying the performance of professionals and dissecting and classifying the different components of the movement. Athletes have to go to specialized studios to gather the data.

There are a few motion capture studios across the country dedicated exclusively to the analysis of sports, especially golf. For a few hundred dollars, any golfer can have his or her swing analyzed or compared with the swing of a professional golfer. Visualization software allows the studios to study the athlete's motions to find any problem areas.

The benefit of using motion capture rather than videotape for this kind of sports application is that motion capture yields a three-dimensional representation of the motion that can be examined from any possible angle. A second important advantage is that at the normal speed a videotape records (30 frames per second), most fast-paced motions are not fully captured. Since motion capture is capable of recording at higher frequencies than regular video, much more of the motion is recorded. The system's 10 high frequencies will be capable of recording more data than any other device. This will result in more accurate real-time data.

In addition to the existing applications above, the invention will be capable of these additional applications:

1) Real-time sports tracking for broadcasting

Miniature markers placed on athletes uniforms during a sport event will allow the system to track each of the player's motions in real time. The resulting data will be converted into digital representations of each of the athletes and rendered in real time. The sports commentators will be able to use the system to show repeat action from the event from any angle chosen.

As an example of the above, consider a football game having the system installed in the stadium. Tags 12 are embedded into each of the player's equipment. The ball will also have a set of tags 12 built in.

A digital model of each player will already exist in the computer, such as other elements that will be added to the transmission, such as a stadium, fans, the ball, advertisements and any other decorations.

As each player hits the field, the system will identify him by his ID marker set, and start tracking his movements. The motion will be used to deform the digital representation of each player. Broadcast application plug-in software will enable the program director to place virtual cameras anywhere he or she chooses. The software will allow him to use the motion capture data to recreate an event and add other elements to the scene, such as stadium, audience and advertisements.

The commentators can now show digital repetitions of the plays from angles such as any player's point of view, the ball's point of view or any other conceivable angle and with any camera lens chosen. This will allow them to analyze the game in a very detailed way, identifying situations that the cameras failed to see, such as penalties and other controversial situations. This feature can also be used by referees to resolve controversial plays. This application can be used on most team and individual sporting events.

2) Sports Statistics

Using the same system described above, a profile of each player can be constructed over time. The invention can maintain a database of all of the player's movements for the use of the players, teams and broadcasting networks.

Some of the items that can be extracted from the database are:

1) Player's maximum and average speed
2) Player's arm or leg strength
3) Player's ranges of motion from different criteria The data can be used by players to improve particular areas of their performance. Teams can use it to evaluate their player's investment. Broadcasters can use it to provide statistical analysis during the sports event.

In addition, the system can provide useful information about injuries that occur during the tracking, helping expedite a proper diagnosis.

Entertainment software

Motion capture is used on almost every video game that involves human motion. It is used mainly to create the human animation portion of the game content.

Specific applications of the present invention for entertainment software include:

1) Input devices for computers, arcade systems and game consoles

A small version of the invention with two or more radar systems can be packaged as a consumer product to be used in diverse computer games. Players can interact with the game by way of their own motions. Examples of the kind of games that will benefit from the system 10 of the present invention include fighting games, first person shooting games, driving games, sports games, dancing games and most games that use input devices such as joystick and mouse.

2) Virtual Reality Likeness and Interaction

Players can get their own or other likeness scanned via laser scanner into a 3-dimensional shape and then animated into a virtual environment by the system 10 using the player's own motions. These likenesses can be used in many types of applications. Some that exist today, such as video games, and other future applications, such as remote full-immersion chat and other online applications.

The likenesses can be pre-downloaded into the client (receiving) system and then rendered locally. The only transmission stream would consist of the system data to animate the already downloaded 3D avatar. This kind of system would make possible many applications that would otherwise require extreme bandwidth.

Television and Feature Film

Today the main applications of motion capture in live-action television and feature films are digital extras, digital stunts, and digital crowds. Digital extras are background human characters that for one reason or another have to be digitally generated. An example of such a case is a shot of the ship in the feature film Titanic as it leaves port. A live shot like this would be filmed with a helicopter and a lot of extras walking on deck, but since the actual ship did not exist, a miniature ship was shot, using a motion control camera. Because of the size of the shot, filming real people in green screen to composite over the ship would have been impossible, so the only solution was to create digital extras.

Digital stunts are actions that either are not humanly possible or that need to be seen on screen performed by a person other than the stunt person.

New applications of the present invention in television and feature film production:

1) On Set Tracking and Surveying

When shooting a film that requires visual effects, the visual effects team usually has to survey and measure all or part of the set in order to incorporate digital elements in the proper locations. This is a lengthy process that carries a high cost, as crew and cast are usually waiting for this process to finish. In addition, if elements in the set are moved they can render the collected data unusable. A single installation of the system 10 of the present invention in a film set can continuously track the necessary information about the set during the length of the shoot. It will also in many cases track any set changes, such as prop relocations.

The tracking of the set would be achieved by placing miniature markers in various areas in the set, such as corners. These markers will enable the visual effects team to reconstruct the set gross measurements digitally. The markers can be hidden from camera view, eliminating expensive post-production cleanup.

The system data can be synchronized with the film time code so that the exact state of the set at the time of the filming can be known.

1) Camera Tracking

With a system as described above, the visual effects team can also place markers on the camera, allowing them to marry the effects with the live action shot with a moving camera.

1) Talent and Prop Tracking

Tracking props and talent can be very useful when in need of adding certain elements digitally. For example, a digital appliance needs to be added to an actor (i.e. a third eye). Placing three small markers on the actor's skull such as hiding the markers beneath the actor's hair, can give the visual effects team and an exact track of the actors head. Tracking props that will be augmented or replaced digitally is also a promising application.

Although several embodiments have been described in detail for purposes of illustration, various modifications may be made without departing from the scope and spirit of the invention. Accordingly, the invention is not to be limited, except as by the appended claims.

What is claimed is:

1. A method for tracking object movement, comprising the steps of:
   placing a plurality of sensors around a capture zone;
   placing a stationary reference tag within the capture zone;
   coupling at least one tag on at least one object to be tracked in the capture zone;
   periodically transmitting signals from the reference tag and at least one object tag;
   receiving the signals at the sensors;
   determining code phase and carrier phase measurements for each signal received; and
   processing the code phase and carrier phase measurements to determine the position of the at least one tag with respect to the reference tag.

2. The method of claim 1, wherein the processing step includes the step of forming single difference measurements for each object tag measurement and reference tag measurement.

3. The method of claim 2, wherein the processing step further includes the step of determining the position of the at least one object tag with respect to the reference tag by forming double difference measurements, including pair wise differencing the single difference measurements from different sensors relating to the same object tag.

4. The method of claim 3, wherein the processing step further includes the step of combing double difference measurements.

5. The method of claim 1, wherein the reference and each object tag transmits signal bursts modulated with a digital data pattern.

6. The method of claim 5, wherein the digital data pattern comprises a portion common to all tags, and a portion unique to each tag.

7. The method of claim 6, wherein the common portion comprises a Neuman-Hofman synchronization code.

8. The method of claim 6, wherein the unique portion comprises code words of a binary extended quadratic residue code.

9. The method of claim 1, wherein the at least one object tag comprises multiple object tags, and wherein the object tags are divided into segments of a transmission frequency band range.

10. The method of claim 9, wherein the tags transmit in approximately the 5.8 GHz band range, the 60 GHz band range, or the 2.4 GHz band range.

11. The method of claim 1, wherein at least four sensors are placed around the capture zone.

12. The method of claim 1, wherein the code phase and carrier phase measurements are determined utilizing digital matched filters.

13. The method of claim 1, wherein the carrier phase measurements are corrected for variations in the radio refractive index.

14. The method of claim 1, wherein the tag signals are circularly polarized.

15. The method of claim 1, including the step of calibrating the sensors.

16. The method of claim 1, wherein the carrier phase measurements are corrected for sensor antenna phase center variations as a function of signal arrival angle.

17. The method of claim 1, including the step of determining velocity, acceleration and jerk of each object tag in any given axis based on the change of object tag position over time.

18. A method for tracking object movement, comprising the steps of:
   placing at least four sensors around a capture zone;
   placing a stationary reference tag having a unique identification code within the capture zone;
   coupling a plurality of tags on at least one object to be tracked in the capture zone, each object tag having a unique identification code;
   periodically transmitting signals from the reference tag and at least one object tag;
   receiving the signals at the sensors;
   processing the signals to extract the identification code, code phase and carrier phase measurements for each signal received using digital matched filters;
   forming single difference measurements for each object tag measurement and reference tag measurement;
   determining the position of the at least one object tag with respect to the reference tag by forming double difference measurements, including pair wise differencing the single difference measurements from different sensors relating to the same object tag, and combing the double difference measurements.

19. The method of claim 18, wherein the reference and each object tag transmits signal bursts modulated with a digital data pattern.

20. The method of claim 19, wherein the digital data pattern comprises a portion common to all tags, and a portion unique to each tag comprising the identification code.

21. The method of claim 20, wherein the common portion comprises a Neuman-Hofman synchronization code.

22. The method of claim 20, wherein the unique portion comprises code words of a binary extended quadratic residue code.

23. The method of claim 18, wherein the object tags are divided into segments of a transmission frequency band range.

24. The method of claim 24, wherein the tags transmit in approximately the 5.8 Ghz band range, the 60 GHz band range, or the 2.4 GHz band range.

25. The method of claim 18, wherein the carrier phase measurements are corrected for variations in the radio refractive index.

26. The method of claim 18, wherein the tag signals are circularly polarized.

27. The method of claim 18, including the step of calibrating the sensors.

28. The method of claim 18, wherein the carrier phase measurements are corrected for sensor antenna phase center variations as a function of signal arrival angle.

29. The method of claim 18, including the step of determining velocity, acceleration and jerk of each object tag in any given axis based on the change of object tag position over time.

* * * * *

UNITED STATES PATENT AND TRADEMARK OFFICE
CERTIFICATE OF CORRECTION

PATENT NO. : 6,831,603 B2
DATED : December 14, 2004
INVENTOR(S) : Alberto Menache It is certified that error appears in the above-identified patent and that said Letters Patent is hereby corrected as shown below:

Title page,
Item [75], Inventor, the following should be added:
-- Mark Alan Sturza, Encino CA (US) --.

Signed and Sealed this

Twenty-second Day of February, 2005

JON W. DUDAS
*Director of the United States Patent and Trademark Office*